United States Patent
Nakamura

(10) Patent No.: US 7,593,152 B2
(45) Date of Patent: Sep. 22, 2009

(54) OPTICAL DEVICE

(75) Inventor: Tomoaki Nakamura, Chino (JP)

(73) Assignee: Seiko Epson Corporation (JP)

( * ) Notice: Subject to any disclaimer, the term of this patent is extended or adjusted under 35 U.S.C. 154(b) by 121 days.

(21) Appl. No.: 11/637,975

(22) Filed: Dec. 13, 2006

(65) Prior Publication Data

US 2007/0165096 A1 Jul. 19, 2007

(30) Foreign Application Priority Data

| Jan. 5, 2006 | (JP) | ............................ 2006-000942 |
| Oct. 10, 2006 | (JP) | ............................ 2006-277018 |

(51) Int. Cl.
G02B 26/08 (2006.01)

(52) U.S. Cl. ................................... 359/225

(58) Field of Classification Search .......... 359/223–226
See application file for complete search history.

(56) References Cited

U.S. PATENT DOCUMENTS

| 6,859,121 | B2 * | 2/2005 | Arima ........................ 359/224 |
| 6,954,297 | B2 | 10/2005 | Reboa et al. |
| 6,972,882 | B2 | 12/2005 | Ring et al. |
| 7,023,603 | B2 | 4/2006 | Reboa |
| 7,382,510 | B2 | 6/2008 | Yoda |

| 2003/0202266 | A1 | 10/2003 | Ring et al. |
| 2005/0254111 | A1* | 11/2005 | Griffith et al. ............... 359/224 |

FOREIGN PATENT DOCUMENTS

| JP | 62-165601 | 7/1987 |
| JP | 03-24516 | 2/1991 |
| JP | 07-092409 | 4/1995 |
| JP | 09-42928 | 2/1997 |
| JP | 2000-235152 | 8/2000 |
| JP | 2001-75029 | 3/2001 |
| JP | 2002-072124 | 3/2002 |
| JP | 2003-318582 | 11/2003 |
| JP | 2003-322807 | 11/2003 |
| JP | 2004-001991 | 11/2004 |
| JP | 2004-317956 | 11/2004 |
| JP | 2005-99760 | 4/2005 |
| JP | 2006-162949 | 6/2006 |

* cited by examiner

*Primary Examiner*—Euncha P Cherry
(74) *Attorney, Agent, or Firm*—Harness, Dickey & Pierce, P.L.C.

(57) ABSTRACT

An optical device includes a movable portion having a light reflection portion formed thereon, a drive mechanism operable to pivot the movable portion so as to scan light reflected from the light reflection portion on an object, and a cooler configured to cool the movable portion. The movable portion is pivotable about an axis. With this arrangement, it is possible to prevent the movable portion from being increased in temperature. As a result, the optical device according to the present invention can operate stably.

15 Claims, 12 Drawing Sheets

OPTICAL DEVICE

CROSS-REFERENCE TO RELATED APPLICATION

This application claims priorities to Japanese Patent Applications No. 2006-000942 filed on Jan. 5, 2006 and No. 2006-277018 filed on Oct. 10, 2006 which are hereby expressly incorporated by reference herein in their entirety.

BACKGROUND OF THE INVENTION

1. Field of the Invention

The present invention relates to an optical device, an optical scanner, and an image formation apparatus.

2. Description of the Related Art

For the purpose of size reduction, optical devices employing a torsional vibrator have been used in laser printers for conducting drawing with optical scanning. For example, Japanese laid-open patent publication No. 7-92409 discloses such an optical device.

An optical device disclosed by Japanese laid-open patent publication No. 7-92409 has a movable plate made of silicon, a light reflection portion provided directly on the movable plate, and a pair of torsion springs for supporting both sides of the movable plate. The light reflection portion is made of aluminum. When the pair of the torsion springs are torsionally deformed, the movable plate is rotated (vibrated) so as to conduct optical scanning. At that time, most of light applied to the light reflection portion is reflected from the light reflection portion.

However, a light reflectivity at the light reflection portion cannot perfectly be made 100%. Accordingly, in such an optical device, a portion of light applied to the light reflection portion is converted into heat, which increases the temperature of the movable plate.

Thus, when such an optical device is used for a long period of time, deformation such as a warp may be caused to the movable plate due to heat depending upon the shape of the movable plate or the material of the light reflection portion. In such a case, the flatness of the light reflection portion is deteriorated. Further, properties of a material of the torsion springs may be changed by heat transferred from the movable plate, so that a spring constant of the torsion springs is changed. The deterioration of the flatness of the light reflection portion and the change of the spring constant of the torsion springs make it difficult to achieve a stable drive (drawing).

SUMMARY

The present invention has been made in view of the above drawbacks. It is, therefore, an object of the present invention to provide an optical device, an optical scanner, and an image formation apparatus capable of stable operation.

According to a first aspect of the present invention, there is provided an optical device capable of stable operation. The optical device includes a movable portion having a light reflection portion, a drive mechanism operable to pivot the movable portion so as to scan light reflected from the light reflection portion on an object, and a cooler configured to cool the movable portion. The movable portion is pivotable about an axis.

With the above arrangement, it is possible to prevent the movable portion from being increased in temperature. As a result, the optical device according to the present invention can operate stably.

The optical device may further include a support portion for supporting the movable portion and an elastic connecting portion for connecting the movable portion to the support portion so that the movable portion is pivotable with respect to the support portion. The drive mechanism may be configured to provide torsional deformation to the elastic connecting portion so as to pivot the movable portion.

In this case, it is possible to produce an optical device employing a torsional vibrator having a one-degree-of-freedom vibration system. An optical device having such a torsional vibrator can be manufactured by micromachine technology and be thus made compact in size.

The optical device may further include a support portion for supporting the movable portion, a drive portion for driving the movable portion, a first elastic connecting portion for connecting the drive portion to the support portion so that the drive portion is pivotable with respect to the support portion, and a second elastic connecting portion for connecting the movable portion to the drive portion so that the movable portion is pivotable with respect to the drive portion. The drive mechanism may be configured to provide torsional deformation to the first elastic connecting portion so as to pivot the drive portion and accordingly provide torsional deformation to the second elastic connecting portion so as to pivot the movable portion.

In this case, it is possible to produce an optical device employing a torsional vibrator having a two-degree-of-freedom vibration system. An optical device having such a torsional vibrator can be manufactured by micromachine technology and be thus made compact in size. Further, the torsional vibrator having a two-degree-of-freedom vibration system can reduce a driving voltage and drive a movable portion with a large amplitude.

The cooler may be provided on at least a body of the movable portion. The cooler may include a first heat conduction film made of a material having a heat conductivity higher than that of a material of the body of the movable portion. In this case, the first heat conduction film serves to radiate heat from the movable portion. Thus, heat of the movable portion can positively be radiated to the exterior of the movable portion via the first heat conduction film so as to cool the movable portion. Accordingly, it is possible to prevent the movable portion from being increased in temperature with a relatively simple structure.

The light reflection portion may be provided on the body of the movable portion in the form of a film. The first heat conduction film may be interposed between the body of the movable portion and the light reflection portion. With this arrangement, heat produced by light that has been applied to the light reflection portion but has not been reflected from the light reflection portion can externally be radiated via the first heat conduction film before it is transferred to the movable portion. Thus, it is possible to more reliably prevent the movable portion from being increased in temperature with a relatively simple structure.

The cooler may include a second heat conduction film interposed between the light reflection portion and the first heat conduction film. In this case, the second heat conduction film has a heat conductivity lower than that of the material of the first heat conduction film. Thus, heat produced in the light reflection portion is temporarily stored in the second heat conduction film and then radiated to the exterior of the movable portion via the first heat conduction film. Accordingly, heat produced in the light reflection portion can more reliably be prevented from being transferred to the movable portion, and it is possible to cool the movable portion.

The cooler may include a second heat conduction film interposed between the body of the movable portion and the first heat conduction film. In this case, the second heat conduction film has a heat conductivity lower than that of the material of the first heat conduction film. With this arrangement, while heat produced in the light reflection portion can be radiated to the exterior of the movable portion via the first heat conduction film, heat that has not been radiated via the first heat conduction film can temporarily be stored in the second heat conduction film. The heat stored in the second heat conduction film is then radiated to the exterior of the movable portion via the first heat conduction film. Accordingly, heat produced in the light reflection portion can more reliably be prevented from being transferred to the movable portion, and it is possible to cool the movable portion.

The first heat conduction film may have a function as the light reflection portion. With this arrangement, the first heat conduction film and the light reflection portion can be formed by only one formation process when the optical device is manufactured. Thus, it is possible to reduce cost for the optical device.

The movable portion may be in the form of a plate. The first heat conduction film may be provided so as to substantially cover an entire area of at least one of surfaces of the movable portion. Accordingly, heat of the movable portion can positively be radiated substantially on the entire surface of the movable portion to the exterior of the movable portion via the first heat conduction film. Thus, it is possible to more reliably prevent the movable portion from being increased in temperature.

The cooler may include a heat sink connected to the first heat conduction film. Thus, heat transferred to the first heat conduction film can more positively be radiated from the heat sink. Accordingly, it is possible to more reliably prevent the movable portion from being increased in temperature.

The heat sink may be provided on a portion integrally formed with the movable portion. In this case, heat at the portion integrally formed with the movable portion can be reduced so that it is possible to more reliably prevent the movable portion from being increased in temperature.

The optical device may further includes a support portion for supporting the movable portion, a drive portion for driving the movable portion, a first elastic connecting portion for connecting the drive portion to the support portion so that the drive portion is pivotable with respect to the support portion, and a second elastic connecting portion for connecting the movable portion to the drive portion so that the movable portion is pivotable with respect to the drive portion. The drive mechanism may be configured to provide torsional deformation to the first elastic connecting portion so as to pivot the drive portion and accordingly provide torsional deformation to the second elastic connecting portion so as to pivot the movable portion. The heat sink may be provided on the drive portion.

With the above arrangement, the possibility that the heat sink is brought into contact with an ambient gas can be increased when the optical device operates. Accordingly, it is possible to enhance cooling effects of the movable portion.

The heat sink may have a plurality of fins arranged at predetermined intervals in a direction of a pivotal axis of the drive portion. Each of the plurality of fins may extend in a direction perpendicular to the pivotal axis of the drive portion. In this case, it is possible to reduce a contact resistance of the heat sink with an ambient gas and enhance cooling effects of the movable portion.

The heat sink may have a central portion and edge portions along a direction perpendicular to a pivotal axis of the drive portion. The edge, portions have a height smaller than the central portion. In this case, inertial forces applied to edge portions of the drive portion can be reduced in the direction perpendicular to the pivotal axis of the drive portion when the optical device operates. Thus, design of the drive portion is facilitated.

According to a second aspect of the present invention, there is provided an optical scanner capable of stable operation. The optical scanner includes a movable portion having a light reflection portion, a drive mechanism operable to pivot the movable portion so as to scan light reflected from the light reflection portion on an object, and a cooler configured to cool the movable portion. The movable portion is pivotable about an axis.

With the above arrangement, it is possible to prevent the movable portion from being increased in temperature. As a result, the optical scanner according to the present invention can operate stably.

According to a third aspect of the present invention, there is provided an image formation apparatus capable of stable operation. The image formation apparatus includes a movable portion having a light reflection portion, a drive mechanism operable to pivot the movable portion so as to scan light reflected from the light reflection portion in at least one of a main scanning direction and a subscanning direction to form an image on an object, and a cooler configured to cool the movable portion. The movable portion is pivotable about an axis.

With the above arrangement, it is possible to prevent the movable portion from being increased in temperature. As a result, the image formation apparatus according to the present invention can operate stably.

The above and other objects, features, and advantages of the present invention will be apparent from the following description when taken in conjunction with the accompanying drawings which illustrate preferred embodiments of the present invention by way of example.

DETAILED DESCRIPTION OF THE PREFERRED EMBODIMENTS

An optical device, an optical scanner, and an image formation apparatus according to preferred embodiments of the present invention will be described below with reference to FIGS. 1 to 11.

Figure 1:
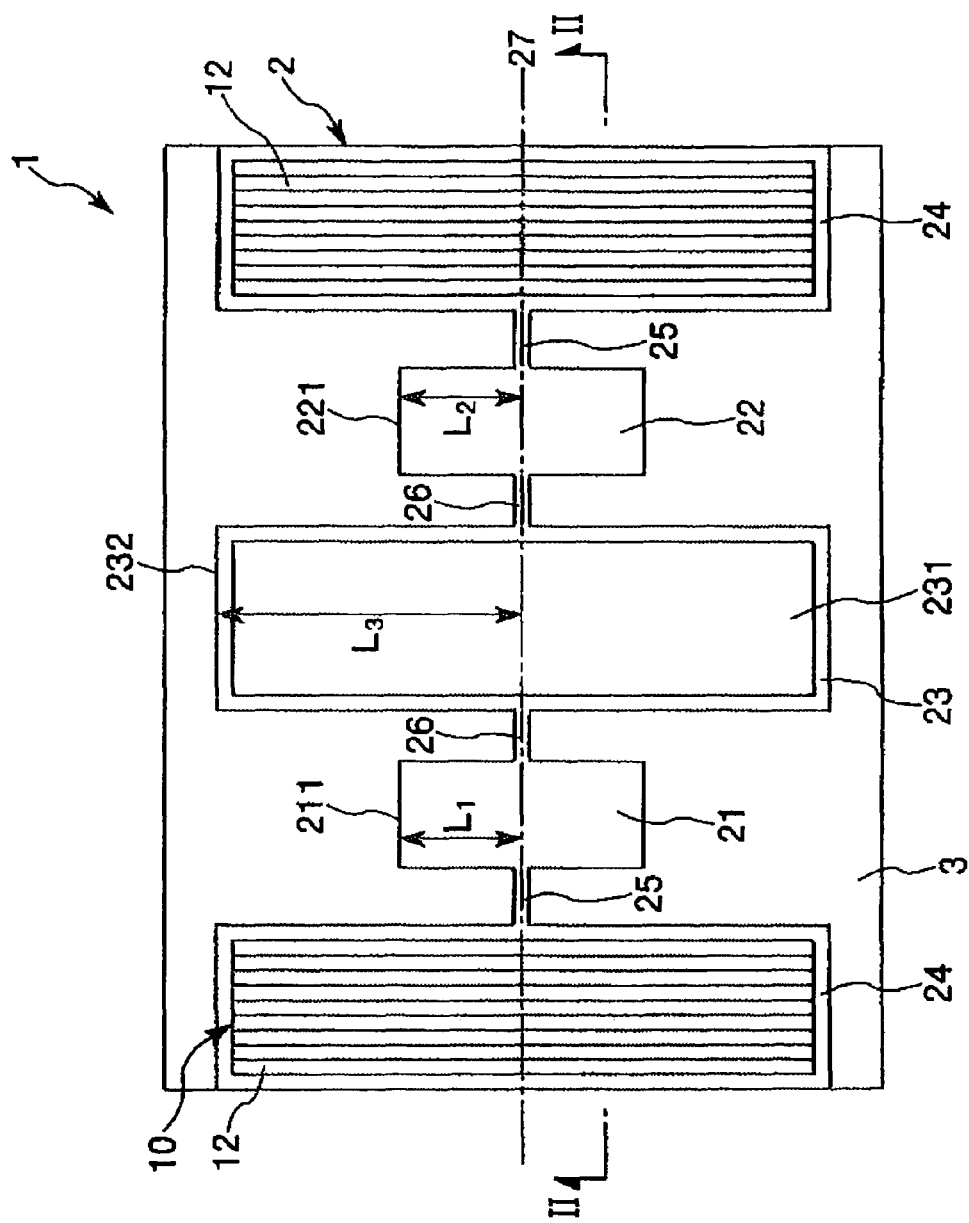
FIG. 1 is a plan view showing an optical device according to a first embodiment of the present invention.
Figure 2:
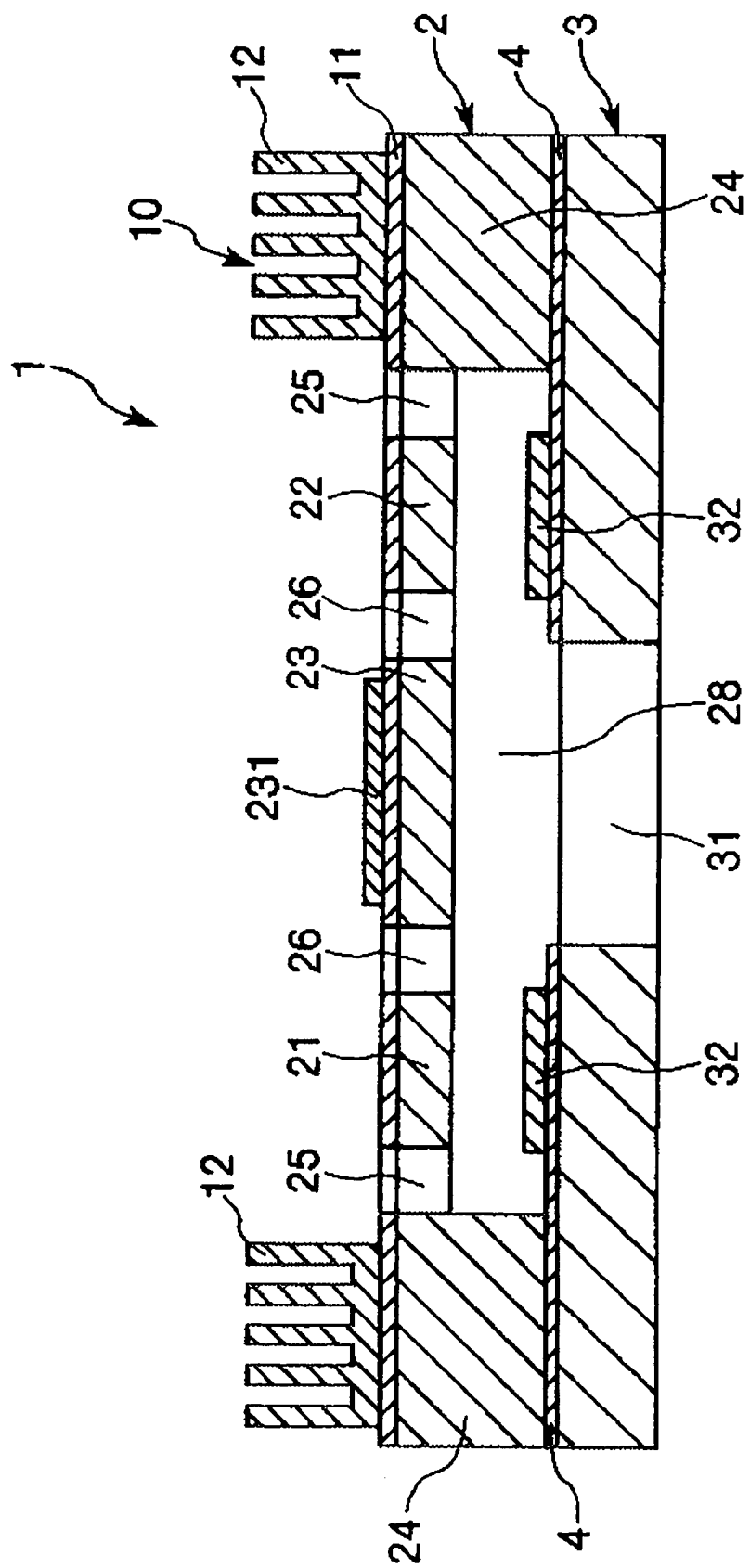
FIG. 2 is a cross-sectional view taken along line II-II of FIG. 1.
Figure 3:
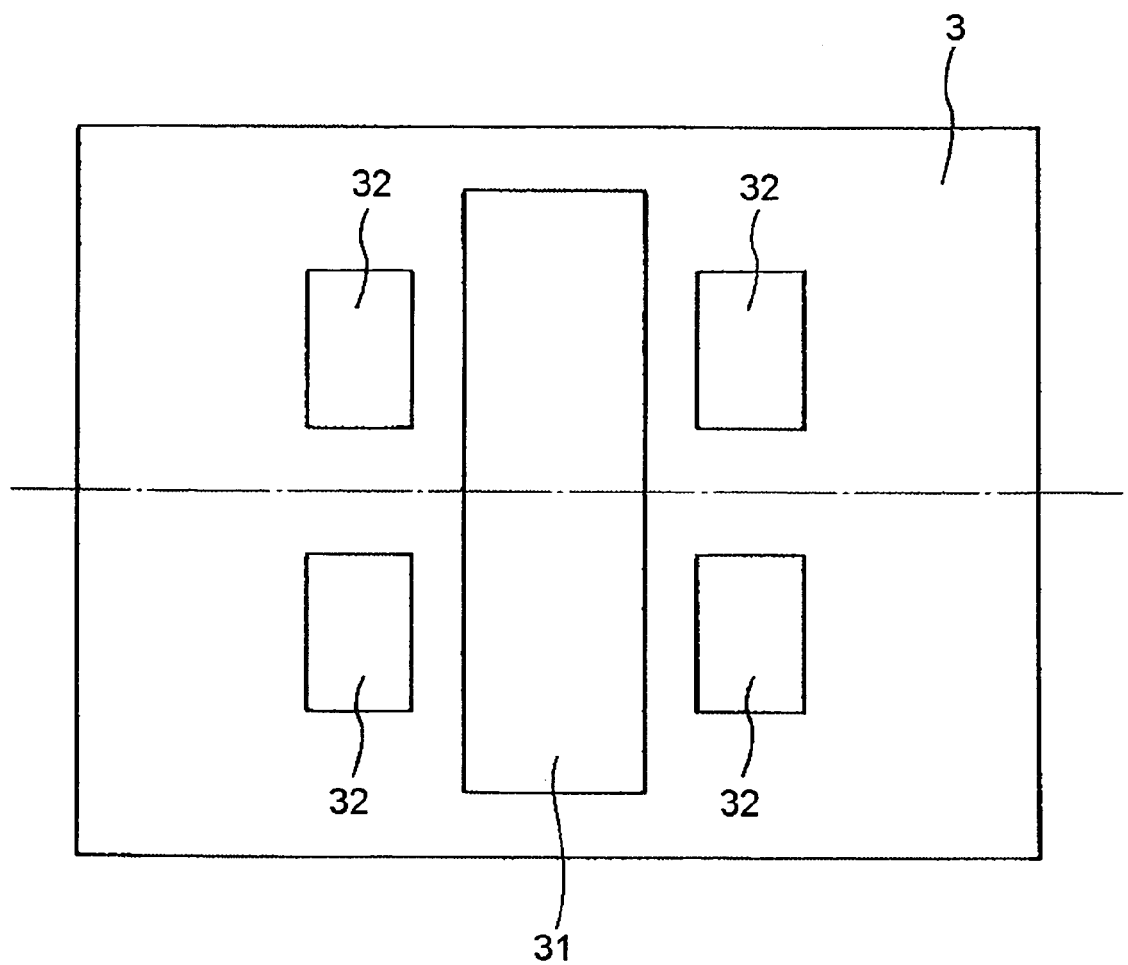
FIG. 3 is a plan view showing an arrangement of electrodes in the optical device shown in FIG. 1.
Figure 4:
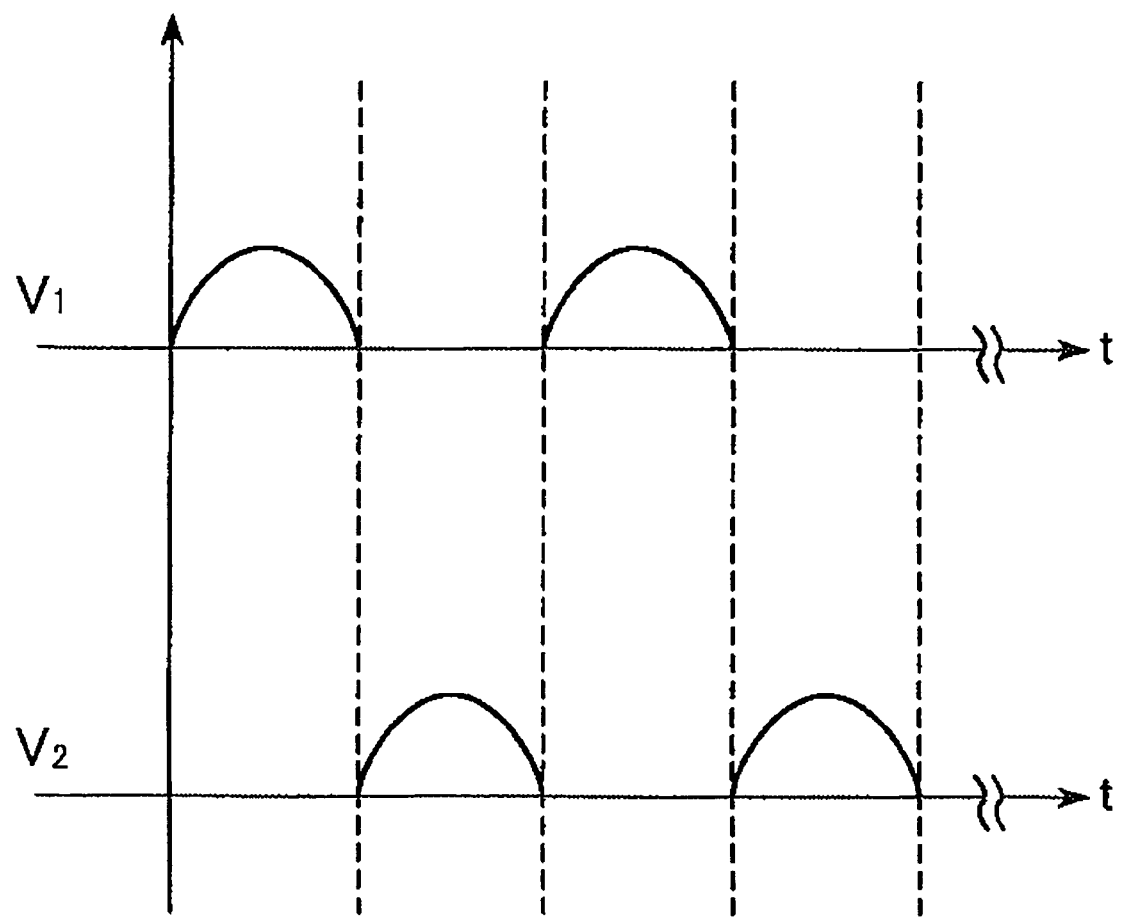
FIG. 4 is a graph showing an example of driving voltages to be applied to the optical device shown in FIG. 1.
Figure 5:
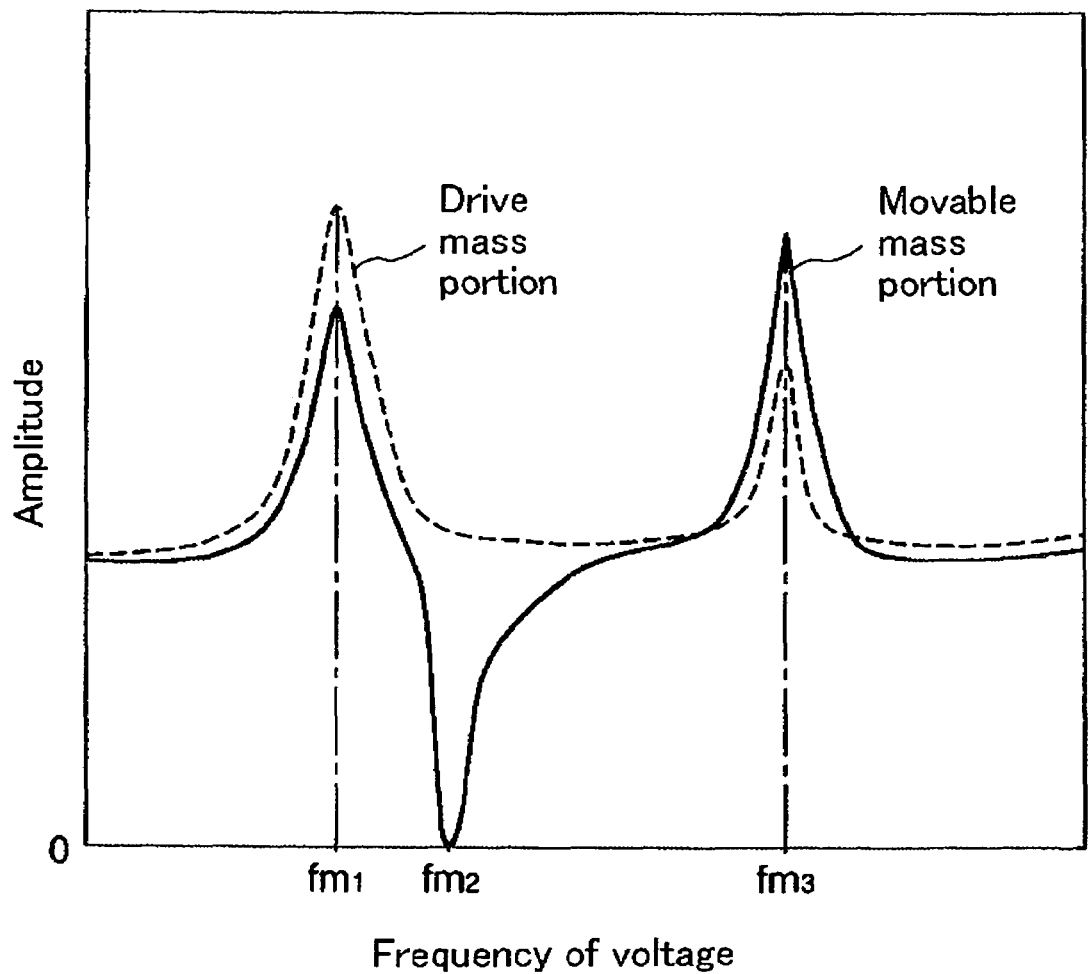
FIG. 5 is a graph showing a relationship between a frequency of an applied driving voltage (alternating voltage) and amplitudes of drive mass portions and a movable mass portion.

First, an optical device according to a first embodiment of the present invention will be described below. FIG. 1 is a plan view (interior perspective view) showing an optical device according to a first embodiment of the present invention. FIG. 2 is a cross-sectional view taken along line II-II of FIG. 1. FIG. 3 is a plan view showing an arrangement of electrodes in the optical device shown in FIG. 1. FIG. 4 is a graph showing an example of driving voltages (alternating voltages) to be applied to the optical device shown in FIG. 1. FIG. 5 is a graph showing a relationship between a frequency of an applied driving voltage (alternating voltage) and amplitudes of drive mass portions and a movable mass portion. In the following description, near, far, right, and left sides in FIGS. 1 and 3 will be referred to as "upper," "lower," "right," and "left," respectively.

As shown in FIG. 1, the optical device 1 includes a base member 2 having a two-degree-of-freedom vibration system. As shown in FIG. 2, the optical device 1 has a counter substrate 3 bonded to a lower surface of the base member 2 via a bonding layer 4 and a cooler 10 attached to an upper surface of the base member 2.

The base member 2 includes a pair of drive mass portions (first mass portions) 21 and 22, a movable mass portion (second mass portion) 23 having a light reflection portion 231 provided on an upper surface of the movable mass portion 23, which is opposite to the counter substrate 3, and a support portion 24 for supporting the drive mass portions 21, 22, and the movable mass portion 23.

Specifically, in the base member 2, the drive mass portion 21 is provided on the left side of the movable mass portion 23 shown in FIGS. 1 and 2, and the drive mass portion 22 is provided on the right side of the movable mass portion 23 shown in FIGS. 1 and 2. In the present embodiment, the drive mass portions 21 and 22 have substantially the same shape and size. The drive mass portions 21 and 22 are located so as to be symmetrical with respect to the movable mass portion 23.

The light reflection portion 231 is provided on the movable mass portion 23 via a heat conduction film 11 of the cooler 10, which will be described later.

Further, as shown in FIGS. 1 and 2, the base member 2 has a pair of first elastic connecting portions 25 and 25 for connecting the drive mass portions 21 and 22 to the support portion 24, respectively, and a pair of second elastic connecting portions 26 and 26 for connecting the movable mass portion 23 to the drive mass portions 21 and 22, respectively. The first elastic connecting portions 25 and the second elastic connecting portions 26 are provided coaxially about a pivotal axis (rotational axis) 27. The drive mass portions 21 and 22 can be pivoted about the pivotal axis 27 with respect to the support portion 24. The movable mass portion 23 can be pivoted about the pivotal axis 27 with respect to the drive mass portions 21 and 22.

Thus, the base member 2 has a first vibration system, which is formed by the drive mass portions 21, 22, the first elastic connecting portions 25, and 25, and a second vibration system, which is formed by the movable mass portion 23 and the second elastic connecting portions 26 and 26. Specifically, the base member 2 has a two-degree-of-freedom vibration system including the first vibration system and the second vibration system.

In the present embodiment, the two-degree-of-freedom vibration system is formed so as to have a thickness smaller than the thickness of the entire base member 2 and located at an upper portion of the base member 2 in FIG. 2. In other words, the base member 2 has a thin portion that is thinner than other portions. Holes having different shapes are defined in the thin portion so as to form the drive mass portions 21, 22, the movable mass portion 23, the first elastic connecting portions 25, 25, the second elastic connecting portions 26, and 26. Further, in the present embodiment, the thin portion has an upper surface located on the same plane as an upper surface of the support portion 24 so as to form a space (recessed portion) 28 below the thin portion for allowing the mass portions 21, 22, and 23 to be pivoted.

For example, the base member 2 is mainly made of silicon. The drive mass portions 21, 22, the movable mass portion 23, the support portion 24, the first elastic connecting portions 25, 25, the second elastic connecting portions 26, and 26 are formed integrally with each other. The drive mass portions 21, 22, the movable mass portion 23, the support portion 24, the first elastic connecting portions 25, 25, the second elastic connecting portions 26, and 26 may be formed by a base member 2 made of a substrate having a stacked structure, such as an SOI substrate.

For example, the counter substrate 3 is mainly made of silicon or glass. As shown in FIGS. 2 and 3, the counter substrate 3 has an opening portion 31 defined in an upper surface of the counter substrate 3 at a position corresponding to the movable mass portion 23. The opening portion 31 forms a relief portion to prevent the movable mass portion 23 from being brought into contact with the counter substrate 3 when the movable mass portion 23 is pivoted (vibrated). With the opening portion (relief portion) 31, it is possible to prevent the optical device 1 from being enlarged in size and to increase a deflection angle (amplitude) of the movable mass portion 23. When the counter substrate 3 of the optical device 1 is mainly made of silicon, a relief portion such as the aforementioned opening portion 31 can readily be formed with high accuracy (high aspect ratio).

As long as the relief portion has an arrangement that can achieve the above effects, the relief portion may not be opened (released) on a lower surface of the counter substrate 3, which is opposite to the movable mass portion 23. Specifically, the relief portion may be formed by a recess formed in an upper surface of the counter substrate 3. Further, if the space 28 has a large depth with respect to a deflection angle (amplitude) of the movable mass portion 23, then the relief portion may not be provided.

As shown in FIG. 3, a pair of electrodes 32 are provided via the bonding layer 4 on the upper surface of the counter substrate 3, which faces the base member 2, at positions corresponding to the drive mass portion 21 so as to be substantially symmetrical with respect to the pivotal axis 27. Further, a pair of electrodes 32 are provided via the bonding layer 4 at positions corresponding to the drive mass portion 22 so as to be substantially symmetrical with respect to the pivotal axis 27. Thus, two pairs of electrodes 32 (four electrodes in total) are provided in the present embodiment.

The drive mass portions 21, 22 and the electrodes 32 are connected to a power source (not shown) so that an alternating voltage (driving voltage) can be applied between the drive mass portions 21, 22 and the electrodes 32. Thus, the drive mass portions 21, 22, and the electrodes 32 form a drive mechanism for driving the movable mass portion 23 (more specifically, the drive mass portions 21 and 22).

Each of the drive mass portions 21 and 22 has an insulator film (not shown) formed on its surface facing the electrodes 32. The insulator film prevents a short circuit from being caused between the drive mass portions 21, 22 and the electrodes 32.

The bonding layer 4 has a function of bonding the base member 2 and the counter substrate 3 to each other. A material for the bonding layer 4 is not limited to a specific material as long as it can bond the base member 2 and the counter substrate 3 to each other. When each of the base member 2 and the counter substrate 3 is mainly made of silicon, it is desirable to use glass containing movable ions as a material for the bonding layer 4. With use of such glass, the base member 2 and the counter substrate 3 mainly made of silicon can be bonded to each other via the bonding layer 4 by anodic bonding.

Further, in the present embodiment, the aforementioned electrodes 32 are provided on the upper surface of the bonding layer 4. Accordingly, it is possible to adjust a gap between the drive mass portions 21, 22 and the electrodes 32. When the bonding layer 4 is made of a material having insulation properties, insulation is ensured between the electrodes 32 and the counter substrate 3.

The cooler 10 provided on the upper surface of the base member 2 will be described below.

The cooler 10 has a function of cooling the movable mass portion 23. Thus, it is possible to prevent the temperature of the movable mass portion 23 from being increased. As a result, it is possible to prevent deformation of the movable mass portion 23 or changes of spring constants of the second elastic connecting portions 26, thereby stabilizing the drive of the optical device 1.

More specifically, the cooler 10 includes a heat conduction film 11 formed on the upper surface of the movable mass portion 23 and heat sinks 12 connected to the heat conduction film 11. The heat conduction film 11 has a high heat conductivity. The heat conduction film 11 is provided on a body of the movable mass portion 23.

The heat conduction film 11 is made of a material having a heat conductivity higher than that of a material of the movable mass portion 23 (the body of the movable mass portion 23), i.e., the base member 2. Accordingly, heat can be radiated from the movable mass portion 23 via the heat conduction film 11. Thus, heat in the movable mass portion 23 is positively radiated to the exterior of the movable mass portion 23 via the heat conduction film 11, so that the movable mass portion 23 can be cooled. It is possible to prevent the movable mass portion 23 from being increased in temperature with a relatively simple arrangement.

Particularly, in the present embodiment, the heat conduction film 11 is interposed between the body of the movable mass portion 23 and the light reflection portion 231. Accordingly, heat produced by light that has been applied to the light reflection portion 231 but has not been reflected from the light reflection portion 231 can externally be radiated via the heat conduction film 11 before it is transferred to the movable mass portion 23. Thus, it is possible more reliably prevent the movable mass portion 23 from being increased in temperature with a relatively simple structure.

Further, the heat conduction film 11 is provided so as to substantially cover the entire surface of the movable mass portion 23. Accordingly, heat of the movable mass portion 23 can positively be radiated substantially on the entire surface of the movable mass portion 23 to the exterior of the movable mass portion 23 via the heat conduction film 11. Thus, it is possible to more reliably prevent the movable mass portion 23 from being increased in temperature. The heat conduction film may be provided on upper and lower surfaces of the movable mass portion 23 or only on a lower surface of the movable mass portion 23.

The material having a heat conductivity is not limited to a specific material. Examples of the material having a heat conductivity includes metals (metal elements) such as Li, Be, B, Na, Mg, Al, K, Ca, Sc, V, Cr, Mn, Fe, Co, Ni, Cu, Zn, Ga, Rb, Sr, Y, Zr, Nb, Mo, Cd, In, Sn, Sb, Cs, Ba, La, Hf, Ta, W, Tl, Pb, Bi, Ce, Pr, Nd, Pm, Sm, Eu, Gd, Tb, Dy, Ho, Er, Tm, Yb, Lu, Ag, Au, Pt, and Pd, alloys containing at least one of these metals, oxides containing at least one of these metals, and nitrides containing at least one of these metals. It is desirable that the material having a heat conductivity is made of a metal material such as aluminum, copper, titanium, or stainless steel, or a ceramic material such as aluminum nitride or silicon nitride.

Each of the heat sinks 12 has a plurality of fins for heat radiation. With such fins, it is possible to increase a contact area with an external gas. The heat sinks 12 have a function of receiving heat from the heat conduction film 11 and radiating the heat. Since the cooler 10 has the heat sinks 12 connected to the heat conduction film 11, heat transferred to the heat conduction film 11 can more positively be radiated from the heat sinks 12. Accordingly, it is possible to more reliably prevent the movable mass portion 23 from being increased in temperature.

Further, the heat sinks 12 are provided on the support portion 24. Thus, the heat sinks 12 are provided on portions integrally formed with the movable mass portion 23. Accordingly, heat at the portions integrally formed with the movable mass portion 23, more specifically, heat at the entire base member 2 can be reduced so that it is possible to more reliably prevent the movable mass portion 23 from being increased in temperature.

The heat sinks 12 are made of a material having a heat conductivity higher than that of the material of the movable mass portion 23, i.e., the base member 2. The aforementioned examples of the material having a heat conductivity can also be used for the heat sinks 12.

In the present embodiment, the heat sinks 12 are formed separately from the heat conduction film 11. However, the heat sinks 12 may be formed integrally with the heat conduction film 11.

The optical device 1 having the above arrangement operates as follows.

For example, a sinusoidal voltage (alternating voltage) is applied between the drive mass portions 21, 22 and the electrodes 32. Specifically, the drive mass portions 21 and 22 are grounded. A voltage $V_1$ shown in FIG. 4 is applied to the two electrodes 32 located on an upper side of FIG. 3, and a voltage $V_2$ shown in FIG. 4 is applied to the two electrodes 32 located on a lower side of FIG. 3. As a result, electrostatic forces (Coulomb forces) are produced between the drive mass portions 21, 22 and the electrodes 32.

The drive mass portions 21 and 22 are attracted to the electrodes 32 by the electrostatic forces. The electrostatic forces vary according to a phase of the sine wave, so that the drive mass portions 21 and 22 are vibrated (pivoted) about the pivotal axis 27 (the first elastic connecting portions 25) so as to be inclined with respect to the surface of the base member 2 (paper surface of FIG. 1).

As the drive mass portions 21 and 22 are vibrated (pivoted), the movable mass portion 23, which is coupled to the drive mass portions 21 and 22 via the second elastic connecting portions 26, is also vibrated (pivoted) about the pivotal axis 27

(the second elastic connecting portions 26) so as to be inclined with respect to the surface of the base member 2 (paper surface of FIG. 1).

As the movable mass portion 23 is thus pivoted, the light reflection portion 231 is also pivoted so as to conduct scanning with light applied to the light reflection portion 231.

At that time, a portion of light applied to the light reflection portion 231 is not reflected from the light reflection portion 231 but is converted into heat. The heat is transferred through the heat conduction film 11 to the heat sinks 12 and radiated to the exterior of the optical device 1. Thus, it is possible to prevent the movable mass portion 23 from being increased in temperature due to the heat produced at the light reflection portion 231. Accordingly, deformation such as a warp due to a temperature increase is not caused to the movable mass portion 23, so that the optical device 1 can operate stably so as to conduct drawing or optical scanning with high accuracy.

In the aforementioned example of the optical device 1, as described above, the opening portion 31 is defined in the counter substrate 3 at a portion corresponding to the movable mass portion 23. Further, the space 28 is defined in the lower surface of the base member 2 shown in FIG. 2. The space 28 is arranged such that the drive mass portions 21 and 22 are located within the space (recessed portion) 28 in the plan view.

With such an arrangement, a large space is ensured for vibrating the movable mass portion 23 and vibrating the drive mass portions 21 and 22. Accordingly, the mass portions 21, 22, and 23 (the two-degree-of-freedom vibration system) can be prevented from being brought into contact with the counter substrate 3 even if the drive mass portions 21 and 22 are vibrated with a large deflection angle or the movable mass portion 23 is vibrated with a large deflection angle due to resonance in a case where the weight of the drive mass portions 21 and 22 is set to be a relatively small value.

Therefore, for example, when the above optical device 1 is applied to an optical scanner, it is possible to conduct scanning with a higher resolution. The above optical device 1 can be applied not only to an optical scanner, but also to an optical switch, an optical attenuator, and the like. When the above optical device 1 is used as an optical device other than an optical scanner, it is possible to stabilize a switching property or a damping property for a long period of time.

In the present embodiment, since the drive mass portions 21 and 22 are provided independently of each other, the drive mass portions 21 and 22 do not interfere with the movable mass portion 23. Accordingly, it is possible to reduce $L_1$, which is a length from the pivotal axis of the drive mass portion 21 along a direction (longitudinal direction) substantially perpendicular to the pivotal axis (i.e., a distance between the pivotal axis and an edge portion 211 of the drive mass portion 21), and $L_2$, which is a length from the pivotal axis of the drive mass portion 22 along a direction (longitudinal direction) substantially perpendicular to the pivotal axis (i.e., a distance between the pivotal axis and an edge portion 221 of the drive mass portion 22), irrespective of the size of the movable mass portion 23 (a length $L_3$ from the pivotal axis of the movable mass portion 23 along a direction (longitudinal direction) substantially perpendicular to the pivotal axis, i.e., a distance $L_3$ between the pivotal axis and an edge portion 232 of the movable mass portion 23). Thus, it is possible to increase rotational angles (deflection angles) of the drive mass portions 21 and 22 and also increase a rotational angle of the movable mass portion 23.

Further, distances between the drive mass portions 21, 22 and the electrodes 32 can be made short by reducing the lengths $L_1$ and $L_2$. Thus, electrostatic forces are increased, so that an alternating voltage to be applied between the drive mass portions 21, 22 and the electrodes 32 can be reduced.

The drive mass portions 21, 22 and the movable mass portion 23 are designed so as to maintain relationships of $L_1 < L_3$ and $L_2 < L_3$. With these relationships, the lengths $L_1$ and $L_2$ can further be reduced, and the rotational angles of the drive mass portions 21 and 22 can further be increased. Accordingly, it is possible to further increase the rotational angle of the movable mass portion 23. In this case, it is desirable that a maximum rotational angle of the movable mass portion 23 is at least 20°. Further, when the lengths $L_1$ and $L_2$ are thus reduced, the distances between the drive mass portions 21, 22 and the electrodes 32 can be made shorter. Accordingly, it is possible to further reduce an alternating voltage to be applied between the drive mass portions 21, 22 and the electrodes 32.

With the above arrangement, it is possible to achieve low-voltage driving of the drive mass portions 21 and 22 and vibration (pivotal movement) of the movable mass portion 23 with a large rotational angle. Thus, when the optical device 1 is applied to an optical scanner used in a laser printer, a scanning confocal laser microscope, and the like, the device can readily be made compact in size.

In the illustrated embodiment, the lengths $L_1$ and $L_2$ are set to be substantially the same. However, the lengths $L_1$ and $L_2$ may have different values.

Meanwhile, the vibration system (two-degree-of-freedom vibration system) having the mass portions 21, 22, and 23 has frequency characteristics as shown in FIG. 5 between amplitudes (deflection angles) of the drive mass portions 21, 22, and the movable mass portion 23 and frequencies of applied alternating voltages. As shown in FIG. 5, the vibration system has two resonance frequencies $fm_1$ [kHz] and $fm_3$ [kHz] ($fm_1 < fm_3$) at which amplitudes of the drive mass portions 21 and 22 and amplitudes of the movable mass portion 23 become large. The vibration system also has an antiresonant frequency $fm_2$ [kHz] at which amplitudes of the drive mass portions 21 and 22 substantially become zero.

In this vibration system, it is desirable to set a frequency F of alternating voltages applied between the drive mass portions 21, 22 and the electrodes 32 to be substantially equal to the lower frequency $fm_1$ of the two resonance frequencies. In such a case, a deflection angle (rotational angle) of the movable mass portion 23 can be increased while amplitudes of the drive mass portions 21 and 22 are reduced. When the frequency F [kHz] and the resonance frequency $fm_1$ [kHz] meet conditions of $(fm_1-1) \leq F \leq (fm_1+1)$, the frequency F is considered to be substantially equal to the resonance frequency $fm_1$.

Each of the drive mass portions 21 and 22 may have an average thickness of 1 to 1,500 μm, preferably 10 to 300 μm. The movable mass portion 23 may have an average thickness of 1 to 1,500 μm, preferably 10 to 300 μm. Each of the first elastic connecting portions 25 may have a spring constant $k_1$ of $1 \times 10^{-4}$ to $1 \times 10^4$ Nm/rad, preferably $1 \times 10^{-2}$ to $1 \times 10^3$ Nm/rad, more preferably $1 \times 10^{-1}$ to $1 \times 10^2$ Nm/rad. When the first elastic connecting portions 25 have a spring constant in these ranges, it is possible to further increase a rotational angle (deflection angle) of the movable mass portion 23. Each of the second elastic connecting portions 26 may have a spring constant $k_2$ of $1 \times 10^{-4}$ to $1 \times 10^4$ Nm/rad, preferably $1 \times 10^{-2}$ to $1 \times 10^3$ Nm/rad, more preferably $1 \times 10^{-1}$ to $1 \times 10^2$ Nm/rad. When the second elastic connecting portions 26 have a spring constant in these ranges, a deflection angle (rotational angle) of the movable mass portion 23 can be increased while deflection angles of the drive mass portions 21 and 22 are reduced. Further, it is desirable that the spring constant $k_1$ of the first elastic connecting portions 25 is larger than the spring constant $k_2$ of the second elastic connecting portions 26 ($k_1 > k_2$). In such a case, a rotational angle (deflection angle) of the movable mass portion 23 can be increased while deflection angles of the drive mass portions 21 and 22 are reduced.

Furthermore, it is desirable that a relationship of $J_1 \leq J_2$ is maintained between a moment $J_1$ of inertia of each of the drive mass portions 21 and 22 and a moment $J_2$ of inertia of the movable mass portion 23. Mote preferably, a relationship of $J_1 \leq J_2$ should be maintained. In such a case, a rotational angle (deflection angle) of the movable mass portion 23 can be increased while deflection angles of the drive mass portions 21 and 22 are reduced.

Meanwhile, the first vibration system, which includes the drive mass portions 21 and 22 and the first elastic connecting portions 25 and 25, has a natural frequency $\omega_1$ defined by $\omega_1 = (k_1/J_1)^{1/2}$ where $J_1$ is a moment of inertia of each of the drive mass portions 21 and 22, and $k_1$ is a spring constant of each of the first elastic connecting portions 25. The second vibration system, which includes the movable mass portion 23 and the second elastic connecting portions 26 and 26, has a natural frequency $\omega_2$ defined by $\omega_2 = (k_2/J_2)^{1/2}$ where $J_2$ is a moment of inertia of the movable mass portion 23, and $k_2$ is a spring constant of each of the second elastic connecting portions 26. It is desirable that a relationship of $\omega_1 > \omega_2$ is maintained between the natural frequency $\omega_1$ of the first vibration system and the natural frequency $\omega_2$ of the second vibration system. In such a case, a rotational angle (deflection angle) of the movable mass portion 23 can be increased while deflection angles of the drive mass portions 21 and 22 are reduced.

The vibration systems in the present embodiment can be achieved by piezoresistors provided in at least one of a pair of the first elastic connecting portions 25 and a pair of second elastic connecting portions 26. In such a case, it is possible to detect a rotational angle and a rotational frequency and utilize the detection results for control of an attitude of the movable mass portion 23.

For example, the optical device 1 having the above arrangement can be manufactured as follows. FIGS. 6A to 6I are diagrams (vertical cross-sectional views) explanatory of a method of manufacturing the optical device 1 according to the first embodiment of the present invention. In the following description, upper and lower sides in FIGS. 6A through 6I will be referred to as "upper" and "lower," respectively.

<Step A1>

Figure 6A:
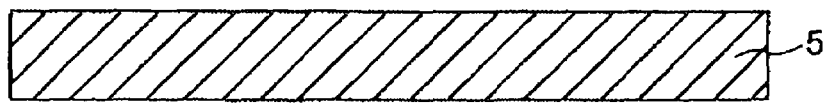
FIGS. 6A to 6I are cross-sectional views explanatory of a method of manufacturing the optical device shown in FIG. 1.
Figure 6B:
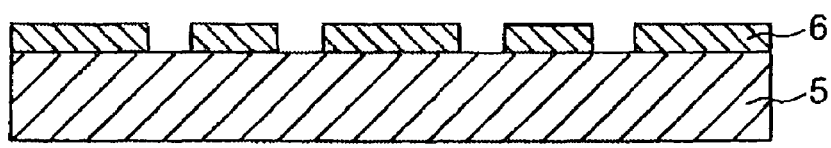
Figure 6C:
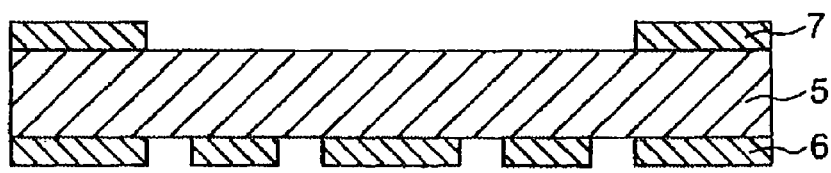

First, as shown in FIG. 6A, a silicon substrate 5 is prepared. Then, as shown in FIG. 6B, a metal mask 6 made of aluminum or the like is formed on a first surface of the silicon substrate 5 so as to correspond to shapes of the support portion 24 and the mass portions 21, 22, and 23. Thereafter, a photoresist is applied to a second surface of the silicon substrate 5, and exposure and development are performed. Thus, as shown in FIG. 6C, a resist mask 7 is formed so as to correspond to a shape of the support portion 24. The resist mask 7 may be formed before the formation of the metal mask 6.

Examples of the formation method of the metal mask 6 include a vacuum evaporation method, a sputtering method (low-temperature sputtering), a dry plating method such as ion plating, a wet plating method such as electrolytic plating and electroless plating, a thermal spraying method, and a metal foil bonding method. These formation methods can also be employed to form a metal film in other steps described below.

Figure 6D:
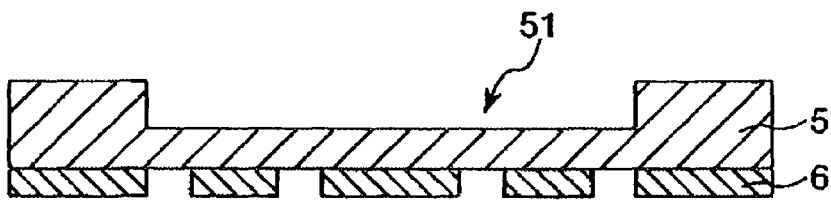

Then, the second surface of the silicon substrate 5, which has the resist mask 7, is etched, and the resist mask 7 is removed. Thus, as shown in FIG. 6D, a recessed portion 51 is formed in an area other than the portion corresponding to the support portion 24.

Examples of the etching method include a physical etching method such as a plasma etching method, a reactive ion etching method, a beam etching method, and a photo-assisted etching method, and a chemical etching method such as a wet etching method. One or more of these methods may be combined with each other. These etching methods can also be employed for etching processes in other steps described below.

Figure 6E:
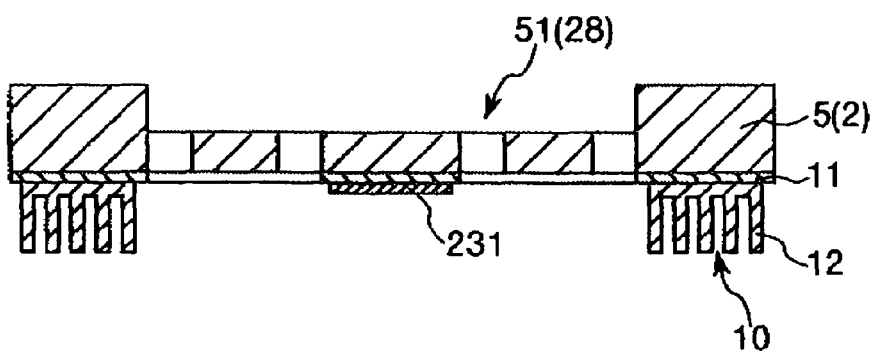

Next, the first surface of the silicon substrate 5, which has the metal mask 6, is etched until the silicon substrate 5 is penetrated at portions corresponding to the recessed portion 51. Then, the metal mask 6 is removed. As shown in FIG. 6E, a heat conduction film 11 is formed on the movable mass portion 23. Then, heat sinks 12 are provided on the heat conduction film 11, and a light reflection portion 231 is formed on the heat conduction film 11. The heat conduction film 11 can be formed in the same manner as described in the formation method of the metal mask 6.

The metal mask 6 may not be removed after the etching of the silicon substrate 5 and utilized as a portion of the heat conduction film 11.

According to the above processes, a structure in which a cooler 10 is formed on a base member 2 having the mass portions 21, 22, 23, and the support portion 24 integrally formed thereon is produced.

<Step A2>

Figure 6F:

Next, as shown in FIG. 6F, a silicon substrate 9 is prepared for formation of a counter substrate 3. Then, a metal mask made of aluminum or the like is formed on one surface of the silicon substrate 9 so as to correspond to portions other than a portion at which an opening portion 31 is to be formed. Thereafter, the surface of the silicon substrate 9, which has the metal mask, is etched, and the metal mask is removed. Thus, a counter substrate 3 in which an opening portion 31 is formed is produced.

Figure 6G:
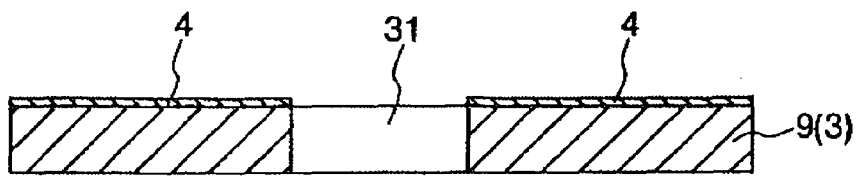

Then, for example, as shown in FIG. 6G, glass containing movable ions is deposited on a first surface of the counter substrate 3 so as to form a bonding layer 4 on the counter substrate 3.

Figure 6H:
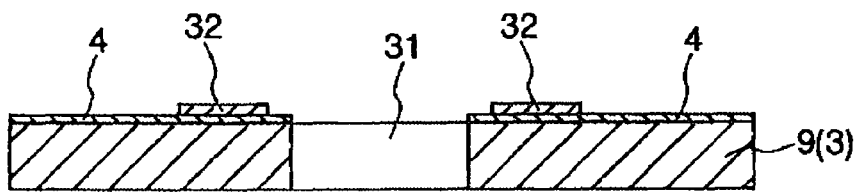

Thereafter, as shown in FIG. 6H, electrodes 32 are formed on the bonding layer 4. Gaps between the electrodes 32 and the drive mass portions 21 and 22 can be controlled by adjusting a thickness of the bonding layer 4. The electrodes 32 are formed as follows: A metal film is deposited on the bonding layer 4. The metal film is etched with a mask corresponding to shapes of the electrodes 32. Then, the mask is removed.

Figure 6I:
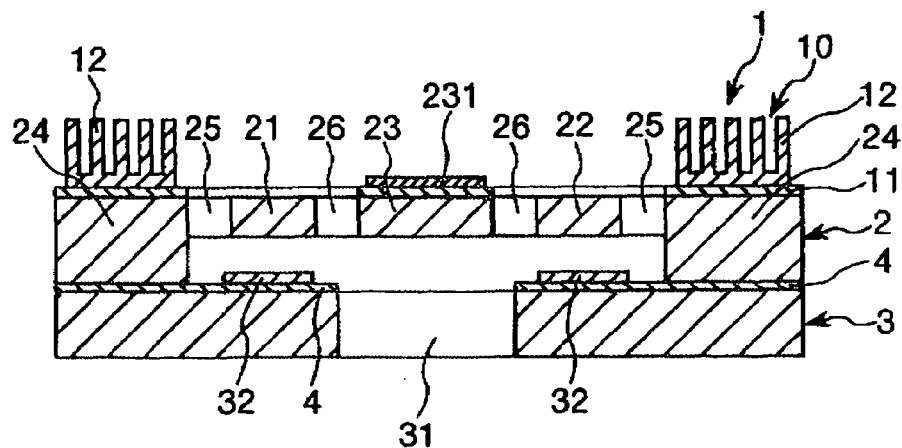

Next, as shown in FIG. 6I, the structure produced in Step A1 and the counter substrate 3 with the bonding layer 4 produced in Step A2 are bonded by, for example, anodic bonding. Thus, an optical device 1 is produced.

In the above manner, an optical device 1 according to the first embodiment of the present invention is produced.

Figure 7:
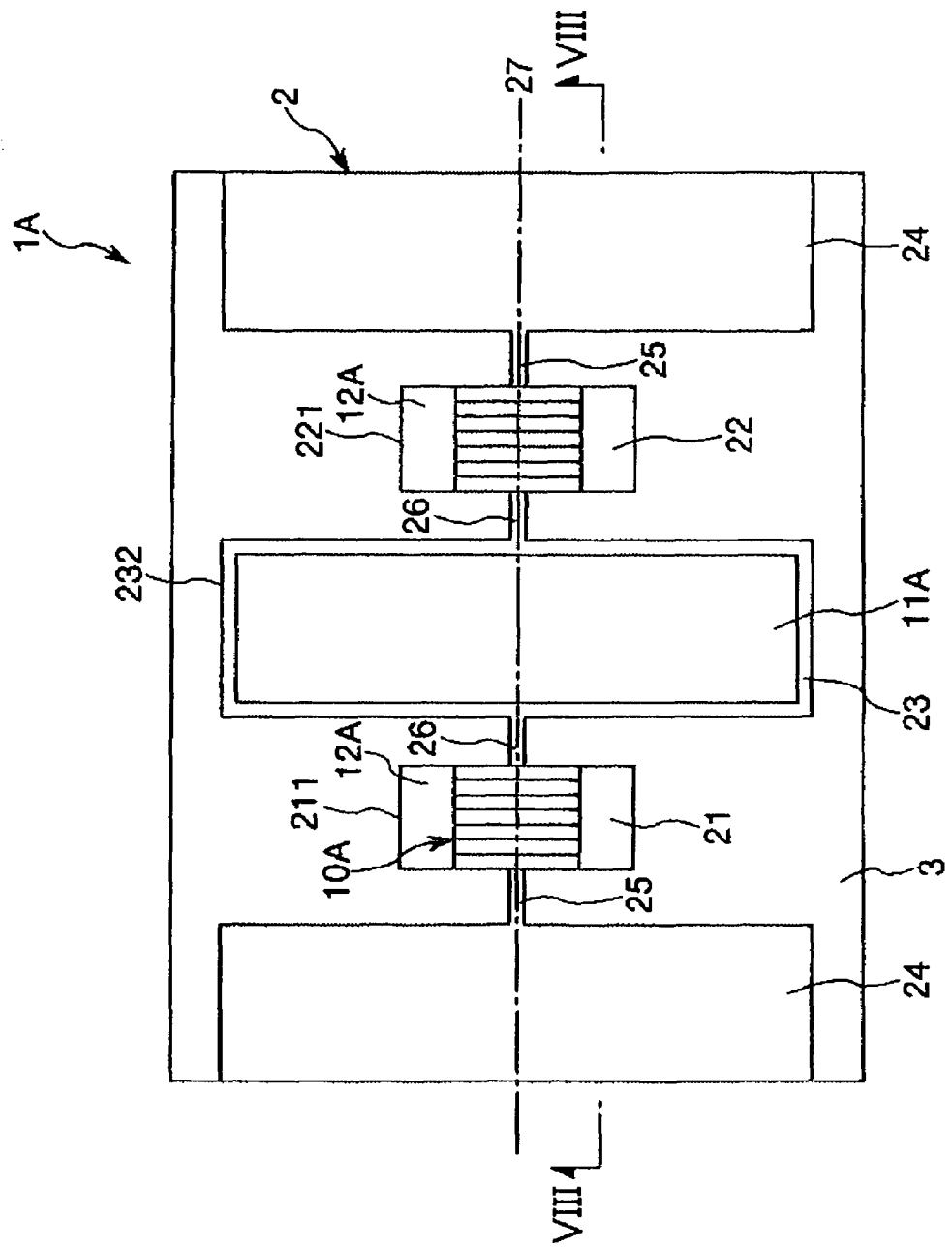
FIG. 7 is a plan view showing an optical device according to a second embodiment of the present invention.
Figure 8:
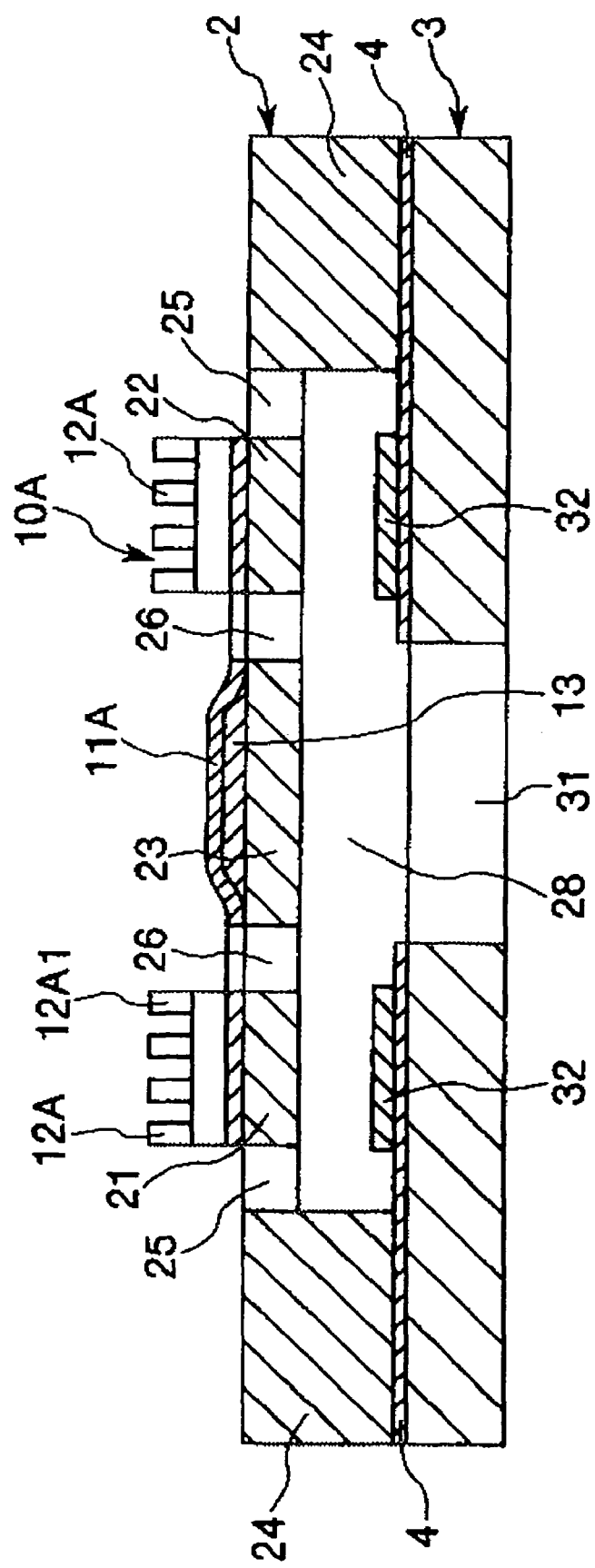
FIG. 8 is a cross-sectional view taken along line VIII-VIII of FIG. 7.

Next, an optical device according to a second embodiment of the present invention will be described below with reference to FIGS. 7 and 8. FIG. 7 is a plan view (interior perspective view) showing an optical device 1A according to the second embodiment of the present invention. FIG. 8 is a cross-sectional view taken along line VIII-VIII of FIG. 7.

The optical device 1A in the present embodiment has the same arrangement as the optical device 1 in the aforementioned first embodiment except for configuration of the cooler. In the optical device 1A of the present embodiment, as shown in FIGS. 7 and 8, a first heat conduction film 11A, which corresponds to the heat conduction film 11 in the first embodiment, is provided on a body of the movable mass portion 23. The first heat conduction film 11A also has a function as a light reflection portion. With this arrangement, the first heat conduction film 11A and the light reflection portion can be formed by only one formation process when the optical device 1A is manufactured. Thus, it is possible to reduce cost for the optical device 1A.

The first heat conduction film 11A is connected to heat sinks 12A. The heat sinks 12A are provided on the drive mass portions 21 and 22. Thus, the possibility that the heat sinks 12A are brought into contact with an ambient gas can be increased when the optical device 1A operates. Accordingly, it is possible to enhance cooling effects of the movable mass portion 23.

Particularly, each of the heat sinks 12A includes fins 12A1 extending in a direction perpendicular to the pivotal axes of the drive mass portions 21 and 22. The fins 12A1 are spaced at predetermined intervals along a direction of the pivotal axes of the drive mass portions 21 and 22. These fins 12A1 can reduce a contact resistance of the heat sinks 12A with an ambient gas and enhance cooling effects of the movable mass portion 23.

Further, in each of the heat sinks 12A, edge portions in a direction perpendicular to the pivotal axis of the drive mass portion 21 or 22 has a height smaller than a central portion of the heat sink 12A. With this arrangement, inertial forces applied to edge portions of the drive mass portion 21 or 22 can be reduced in the direction perpendicular to the pivotal axis of the drive mass portion 21 or 22 when the optical device 1A operates. Thus, design of the drive mass portions 21 and 22 is facilitated.

Particularly, each of the heat sinks 12A is provided at a central portion of the drive mass portion 21 or 22 in the direction perpendicular to the pivotal axis of the drive mass portion 21 or 22. That is, each of the heat sinks 12A is provided at a portion other than the edge portions of the drive mass portion 21 or 22. Accordingly, inertial forces applied to the edge portions of the drive mass portion 21 or 22 can further be reduced in the direction perpendicular to the pivotal axis of the drive mass portion 21 or 22.

In the present embodiment, a second heat conduction film 13 is interposed between the body of the movable mass portion 23 and the first heat conduction film 11A. The second heat conduction film 13 has a heat conductivity lower than a material of the first heat conduction film 11A. With this arrangement, while heat produced in the light reflection portion can be radiated to the exterior of the movable mass portion 23 via the first heat conduction film 11A, heat that has not been radiated via the first heat conduction film 11A can temporarily be stored in the second heat conduction film 13. The heat stored in the second heat conduction film 13 is then radiated to the exterior of the movable mass portion 23 via the first heat conduction film 11A. Accordingly, heat produced in the light reflection portion can more reliably be prevented from being transferred to the movable mass portion 23, and it is possible to cool the movable mass portion 23.

When the light reflection portion 231 and the heat conduction film 11 are separately provided as described in the first embodiment, a heat conduction film having a heat conductivity lower than a material of the heat conduction film 11 may be interposed between the light reflection portion 231 and the heat conduction film 11. In this case, heat produced in the light reflection portion 231 is stored in the heat conduction film (second heat conduction film) having a lower heat conductivity and then radiated to the exterior of the movable mass portion 23 via the heat conduction film 11. Accordingly, heat produced in the light reflection portion 231 can more reliably be prevented from being transferred to the movable mass portion 23, and it is possible to cool the movable mass portion 23.

The aforementioned optical devices 1 and 1A can be applied to optical scanners used in an image formation apparatus such as a laser printer, a bar-code reader, a scanning confocal laser microscope, or an imaging display. An image formation apparatus having an optical scanner using the optical device 1 or 1A according to the present invention can prevent the movable mass portion 23 from being increased in temperature and hence stably operate so as to provide high-definition images for a long period of time.

An image formation apparatus having the aforementioned optical device 1, i.e., a specific example of an image formation apparatus according to the present invention will be described with reference to FIGS. 9 to 11.

First, an example in which the present invention is applied to an electrophotographic printer will be described. FIG. 9 is a schematic cross-sectional view showing an example of an entire arrangement of an image formation apparatus (printer) having an optical scanner according to the present invention.

Figure 9:
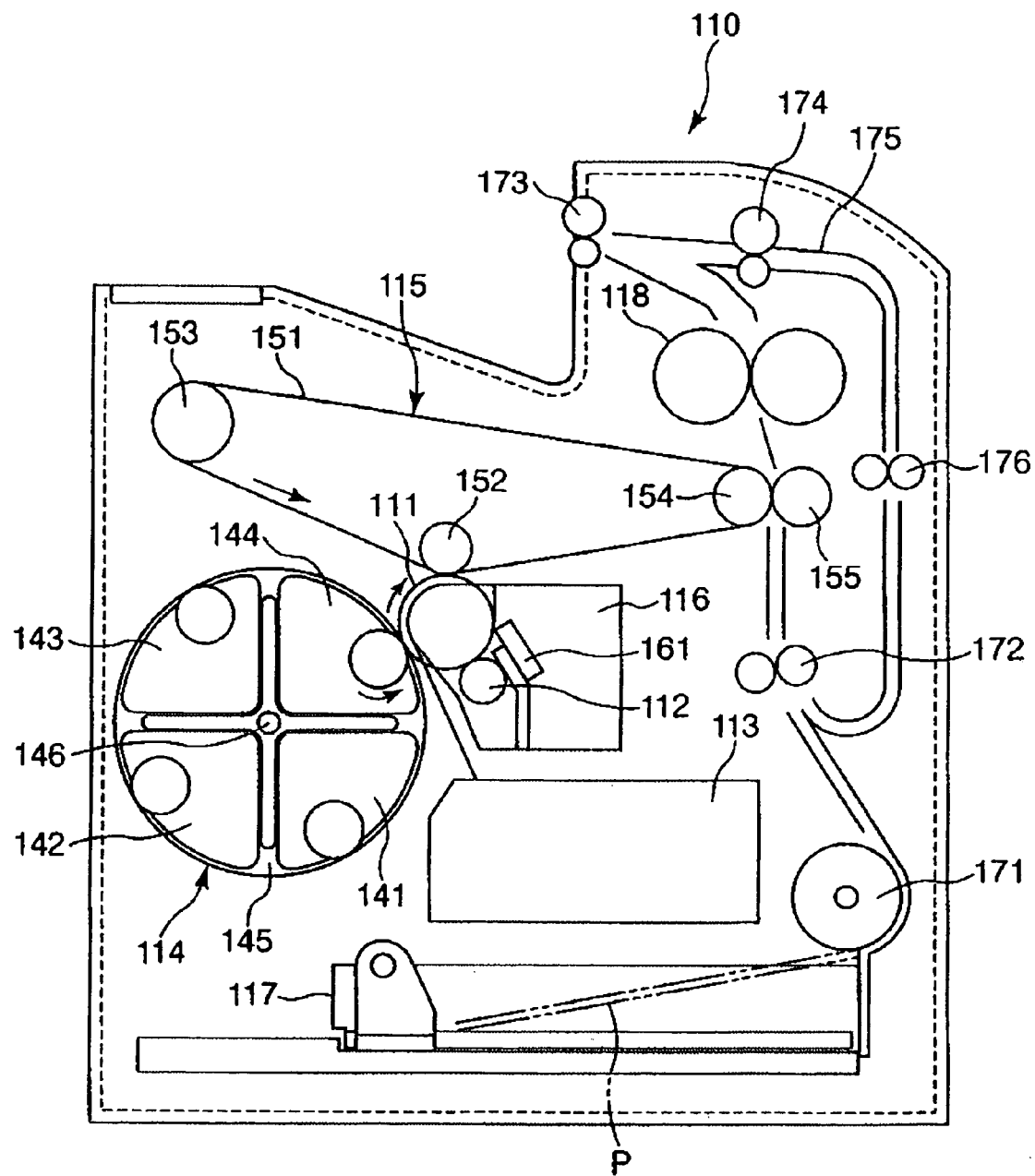
FIG. 9 is a schematic cross-sectional view showing an example of an image formation apparatus (printer) having an optical scanner according to the present invention.

The image formation apparatus 110 (printer) shown in FIG. 9 records an image on a recording medium such as paper or an OHP sheet with a toner through a series of image formation processes including exposure, development, transfer, and fixation. As shown in FIG. 9, the image formation apparatus 110 has a photosensitive member 111 rotatable in a direction indicated by an arrow. The image formation apparatus 110 includes an electrification unit 112, an exposure unit 113, a development unit 114, a transfer unit 115, and a cleaning unit 116, which are disposed in the order named along a direction of rotation of the photosensitive member 111. Further, the image formation apparatus 110 has a paper feeding tray 117 disposed at a lower portion in FIG. 9 for receiving a recoding medium P such as paper and a fixation device 118 disposed at an upper portion in FIG. 9.

For example, the photosensitive member 111 has a cylindrical conductive base material (not shown) and a photosensitive layer (not shown) formed on an outer peripheral surface of the conductive base material. The photosensitive member 111 is rotatable about an axis of the conductive base material.

The electrification unit 112 uniformly electrifies a surface of the photosensitive member 111 by corona charging or the like.

The exposure unit 113 receives image information from a host computer such as a personal computer (not shown) and applies a laser beam selectively to the uniformly charged photosensitive member 111 so as to form an electrostatic latent image on the photosensitive member 111.

Figure 10:
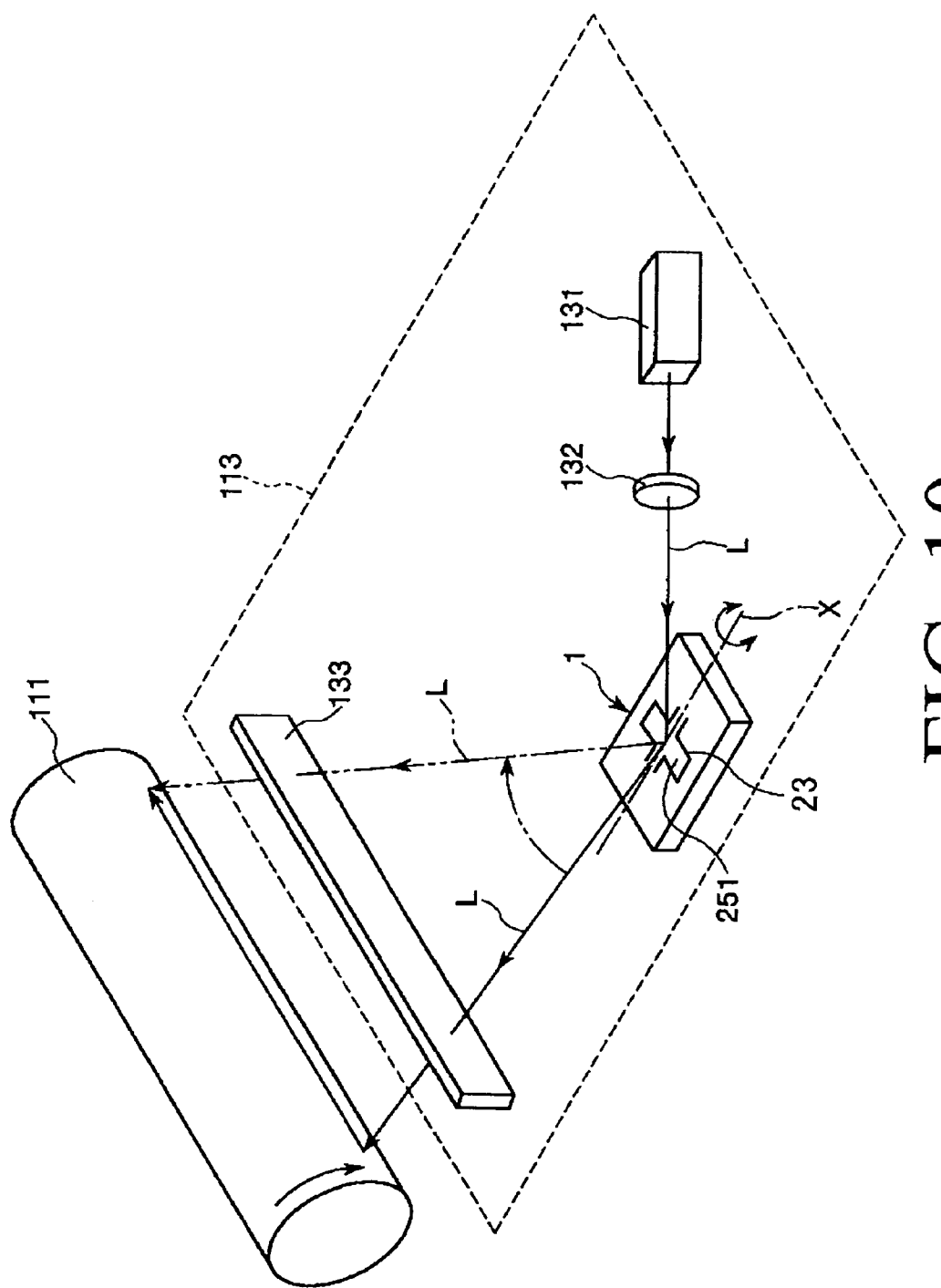
FIG. 10 is a schematic view showing an arrangement of an exposure unit in the image formation apparatus shown in FIG. 9.

More specifically, as shown in FIG. 10, the exposure unit 113 includes an optical device 1 as an optical scanner, a laser beam source 131, a collimator lens 132, an f-theta lens 133. In such an exposure unit 113, a laser beam L is applied from the laser beam source 131 through the collimator lens 132 to the optical device 1 (the light reflection portion 251). The laser beam L is reflected from the light reflection portion 251 and applied through the f-theta lens 133 to the photosensitive member 111.

At that time, when the optical device 1 operates so that the movable mass portion 23 is pivoted about a pivotal axis X, the light (laser beam L) reflected from the light reflection portion 251 is scanned in a direction of an axis of the photosensitive member 111 (main scanning direction). When the photosensitive member 111 is rotated, the light (laser beam L) reflected from the light reflection portion 251 is scanned in a circumferential direction of the photosensitive member 111 (sub-scanning direction). An intensity of the laser beam L outputted from the laser beam source 131 changes according to image information received from the host computer (not shown).

Thus, the exposure unit 113 selectively exposes the photosensitive member 111 so as to conduct image formation (drawing).

The development unit 114 has four development devices 141, 142, 143, and 144, and a holder 145 for holding these development devices. The respective development devices are selectively moved so as to face the photosensitive member 111 by rotating the holder 145 about its axis 146. The development device 141 is for a black (K) toner, the development device 142 for a magenta (M) toner, the development device 143 for a cyan (C) toner, and the development device 144 for a yellow (Y) toner.

The transfer unit 115 includes an intermediate transfer belt 151 in the form of an endless belt, three rollers including a primary transfer roller 152, a driven roller 153, and a drive roller 154 for winding the intermediate transfer belt 151 therearound, and a secondary transfer roller 155 facing the drive roller 154 with the intermediate transfer belt 151 being interposed therebetween. When the drive roller 154 rotates, the intermediate transfer belt 151 is rotated substantially at the same circumferential speed as that of the photosensitive member 111 in a direction indicated by an arrow in FIG. 9 while the primary transfer roller 152 and the driven roller 153 are rotated by the rotation of the intermediate transfer belt 151.

The primary transfer roller 152 serves to transfer a monochrome toner image formed on the photosensitive member 111 to the intermediate transfer belt 151. The secondary transfer roller 155 serves to transfer a monochrome or full-color toner image formed on the intermediate transfer belt 151 to a recording medium P such as paper, film, or cloth. The fixation device 118 serves to heat and press the recording medium P on which the toner image has been transferred to thereby fuse the toner image to the recording medium P and fix the toner image as a permanent image.

The cleaning unit 116 includes a cleaning blade 161 made of rubber. The cleaning blade 161 is brought into contact with a surface of the photosensitive member 111 between the primary transfer roller 152 and the electrification unit 12. The cleaning unit 116 serves to scrap off and remove a toner remaining on the photosensitive member 111 by the cleaning blade 161 after the primary transfer roller 152 has transferred the toner image onto the intermediate transfer belt 151.

In the image formation apparatus 110 having the above arrangement, the photosensitive member 111, a development roller (not shown) provided in the development unit 114, and the intermediate transfer belt 151 are first started to rotate in accordance with commands from the host computer (not shown). While the photosensitive member 111 is rotated, the electrification unit 112 sequentially charges the photosensitive member 111.

The charged area of the photosensitive member 111 is moved to an exposure position by rotation of the photosensitive member 111. Then, a latent image is formed on the charged area by the exposure unit 113 based on image information of a first color (e.g., yellow Y).

The latent image formed on the photosensitive member 111 is moved to a development position by rotation of the photosensitive member 111. Then, the yellow development device 144 develops the latent image with a yellow toner. Thus, a yellow toner image is formed on the photosensitive member 111. At that time, the development device 144 of the development unit 114 faces the photosensitive member 111 at the development position.

The yellow toner image formed on the photosensitive member 111 is moved to a primary transfer position (i.e., a position at which the photosensitive member 111 faces the primary transfer roller 152) by rotation of the photosensitive member 111. At the primary transfer position, the yellow toner image is transferred (primarily transferred) to the intermediate transfer belt 151 by the primary transfer roller 152. At that time, a primary transfer voltage (primary transfer bias) having an opposite polarity to a charge polarity of the toner is applied to the primary transfer roller 152. The secondary transfer roller 155 is separated from the intermediate transfer belt 151 during the transfer.

The same process as described above is repeated for a second color, a third color, and a fourth color so that each color toner image corresponding to each image signal is transferred and layered onto the intermediate transfer belt 151. Thus, a full-color toner image is formed on the intermediate transfer belt 151.

The recording medium P is conveyed from the paper feeding tray 117 to a secondary transfer position (i.e., a position at which the secondary transfer roller 155 faces the drive roller 154) by a paper feeding roller 171 and registration rollers 172.

The full-color toner image formed on the intermediate transfer belt 151 is moved to the secondary transfer position by rotation of the intermediate transfer belt 151 and transferred (secondarily transferred) to the recording medium P by the secondary transfer roller 155. At that time, the secondary transfer roller 155 is pressed against the intermediate transfer belt 151 while a secondary transfer voltage (secondary transfer bias) is applied to the intermediate transfer belt 151.

The full-color toner image transferred to the recording medium P is heated and pressed by fixation device 118, so that the full-color toner image is fused to the recording medium P. Then, in a case of single-side printing, the recording medium P is ejected to the exterior of the image formation apparatus 110 by a pair of paper ejection rollers 173.

After the photosensitive member 111 passes the primary transfer position, a toner attached to the surface of the photosensitive member 111 is scraped off by the cleaning blade 161 of the cleaning unit 116 so as to prepare for electrification to form a next latent image. The scraped toner is recovered in a residue toner recovery portion provided in the cleaning unit 116.

In a case of double-side printing, a recording medium P having a surface subjected to a fixation process by the fixation device 118 is sandwiched between a pair of paper ejection rollers 173. Then, the paper ejection rollers 173 are driven in a reverse direction, and pairs of conveyer rollers 174 and 176 are driven. Thus, the recording medium P is turned over through a conveying passage 175 and returned to the secondary transfer position. Then, the same operation as described above is performed again so as to form an image on another surface of the recording medium P.

Next, an example in which the present invention is applied to an imaging display (display unit) will be described. FIG. 11 is a schematic view showing an example of an image formation apparatus (imaging display) having an optical scanner according to the present invention.

Figure 11:
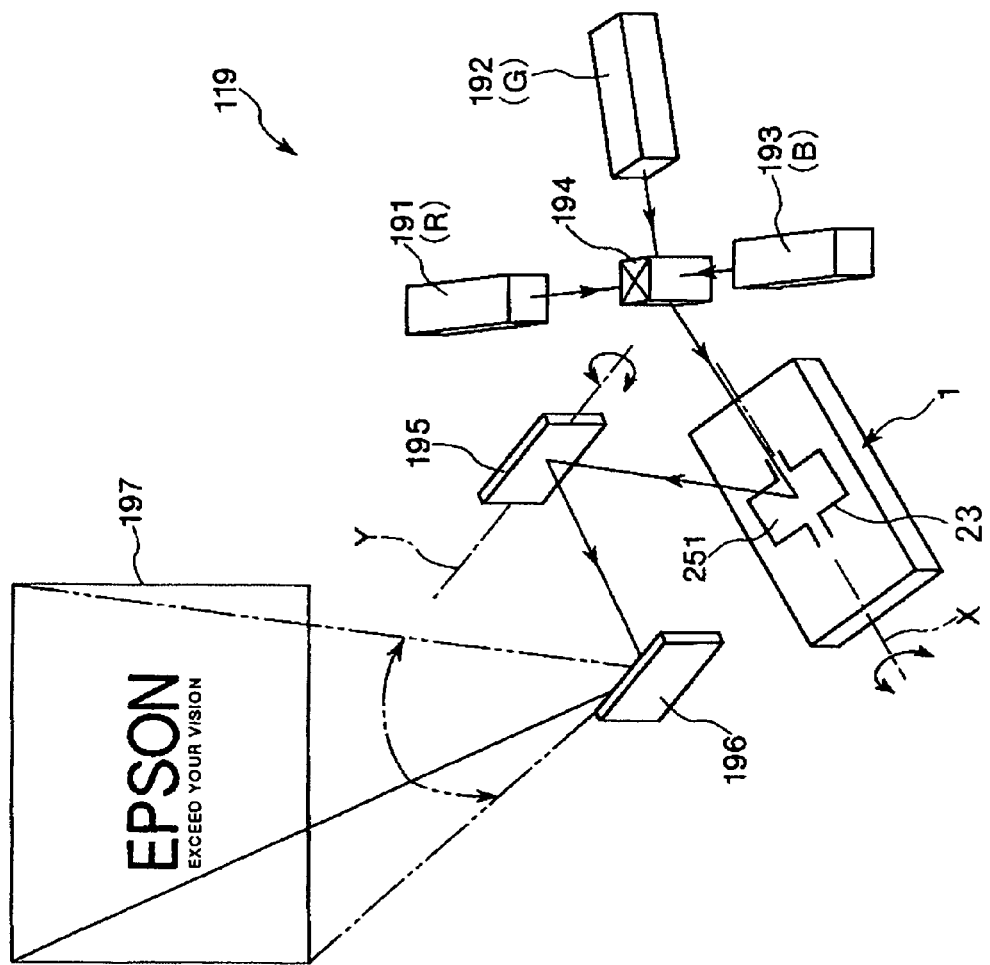
FIG. 11 is a schematic view showing an example of an image formation apparatus (imaging display) having an optical scanner according to the present invention.

The image formation apparatus 119 shown in FIG. 11 has an optical device 1 as an optical scanner, a light source 191 for red (R), a light source 192 for green (G), a light source 193 for blue (B), a cross dichroic prism (X prism) 194, a galvano mirror 195, a stationary mirror 196, and a screen 197.

In the image formation apparatus 119 having the above arrangement, light of respective colors is applied from the light sources 191, 192, and 193 through the cross dichroic prism 194 to the optical device 1 (the light reflection portion 251). At that time, red light from the light source 191, green light from the light source 192, and blue light from the light source 193 are compounded with each other by the cross dichroic prism 194.

The compound light (three-color light) is reflected from the light reflection portion 251, then reflected from the galvano mirror 195, reflected from the stationary mirror 196, and applied to the screen 197.

At that time, when the optical device 1 operates so that the movable mass portion 23 is pivoted about a pivotal axis X, the light reflected from the light reflection portion 251 is scanned in a horizontal direction of the screen 197 (main scanning direction). When the galvano mirror 195 is rotated about its axis Y, the light reflected from the light reflection portion 251 is scanned in a vertical direction of the screen 197 (subscanning direction). An intensity of the light outputted from the light sources 191, 192, and 193 changes according to image information received from a host computer (not shown).

The optical devices described in the first and second embodiments employ a torsional vibrator having a two-degree-of-freedom vibration system. Those optical devices can be manufactured by micromachine technology and be thus made compact in size. Particularly, the torsional vibrator having a two-degree-of-freedom vibration system can reduce a driving voltage and drive a movable portion (movable mass portion 23) with a large amplitude.

The present invention is applicable to an optical device having a vibration system other than a two-degree-of-freedom vibration system. For example, in the first and second embodiments, the drive mass portions and the first elastic connecting portions may be eliminated so that the movable mass portion and the support portion are connected by the second elastic connecting portions. Specifically, the present invention can be applied to an optical device using a torsional vibrator having a one-degree-of-freedom vibration system. An optical device using such a torsional vibrator can also be manufactured by micromachine technology and be thus made compact in size.

Although an optical device, an optical scanner, and an image formation apparatus according to the present invention have been shown and described with certain preferred embodiments, the present invention is not limited to the illustrated embodiments.

For example, an optical device according to the present invention may combine arbitrary components in the first embodiment and arbitrary components in the second embodiment with each other. Further, in an optical device according to the present invention, each component may be replaced with any component having the same function, and any additional components may be added to the above arrangement.

In the aforementioned embodiments, the drive mass portions 21 and 22 are pivoted by electrostatic driving forces, so that the movable mass portion 23 is pivoted. Specifically, a drive mechanism employing electrostatic driving forces is used for driving a movable portion. However, the present invention is not limited to this drive mechanism and may employ other driving methods such as piezoelectric driving. Further, a drive mechanism employing electrostatic driving forces is not limited to the aforementioned parallel-plate type drive mechanism and may employ other mechanisms such as comblike electrodes. Furthermore, a cooler for cooling a movable portion (movable mass portion) is not limited to those in the illustrated embodiments and may employ any cooler as long as it can cool a movable portion or radiate heat from a movable portion.

Although certain preferred embodiments of the present invention have been shown and described in detail, it should be understood that various changes and modifications may be made therein without departing from the scope of the appended claims.

What is claimed is:

1. An optical device comprising:
 a movable portion having a light reflection portion, the movable portion being pivotable about an axis;
 a drive mechanism operable to pivot the movable portion so as to scan light reflected from the light reflection portion on an object; and
 a cooler configured to cool the movable portion,
 wherein the cooler is provided on at least a body of the movable portion, and
 wherein the cooler includes a first heat conduction film made of a material having a heat conductivity higher than that of a material of the body of the movable portion, the first heat conduction film serving to radiate heat from the movable portion.

2. The optical device as recited in claim 1, further comprising:
 a support portion for supporting the movable portion; and
 an elastic connecting portion for connecting the movable portion to the support portion so that the movable portion is pivotable with respect to the support portion,
 wherein the drive mechanism is configured to provide torsional deformation to the elastic connecting portion so as to pivot the movable portion.

3. The optical device as recited in claim 1, further comprising:
 a support portion for supporting the movable portion;
 a drive portion for driving the movable portion;
 a first elastic connecting portion for connecting the drive portion to the support portion so that the drive portion is pivotable with respect to the support portion; and
 a second elastic connecting portion for connecting the movable portion to the drive portion so that the movable portion is pivotable with respect to the drive portion,
 wherein the drive mechanism is configured to provide torsional deformation to the first elastic connecting portion so as to pivot the drive portion and accordingly provide torsional deformation to the second elastic connecting portion so as to pivot the movable portion.

4. The optical device as recited in claim 1, wherein the light reflection portion is provided on the body of the movable portion in a form of a film,
 wherein the first heat conduction film is interposed between the body of the movable portion and the light reflection portion.

5. The optical device as recited in claim 4, wherein the cooler includes a second heat conduction film interposed between the light reflection portion and the first heat conduction film, the second heat conduction film having a heat conductivity lower than that of the material of the first heat conduction film.

6. The optical device as recited in claim 4, wherein the cooler includes a second heat conduction film interposed between the body of the movable portion and the first heat conduction film, the second heat conduction film having a heat conductivity lower than that of the material of the first heat conduction film.

7. The optical device as recited in claim 1, wherein the first heat conduction film has a function as the light reflection portion.

8. The optical device as recited in claim 1, wherein the movable portion is in a form of a plate, wherein the first heat conduction film is provided so as to substantially cover an entire area of at least one of surfaces of the movable portion.

9. The optical device as recited in claim 1, wherein the cooler includes a heat sink connected to the first heat conduction film.

10. The optical device as recited in claim 9, wherein the heat sink is provided on a portion integrally formed with the movable portion.

11. The optical device as recited in claim 10, further comprising:
a support portion for supporting the movable portion;
a drive portion for driving the movable portion;
a first elastic connecting portion for connecting the drive portion to the support portion so that the drive portion is pivotable with respect to the support portion; and
a second elastic connecting portion for connecting the movable portion to the drive portion so that the movable portion is pivotable with respect to the drive portion,
wherein the drive mechanism is configured to provide torsional deformation to the first elastic connecting portion so as to pivot the drive portion and accordingly provide torsional deformation to the second elastic connecting portion so as to pivot the movable portion,
wherein the heat sink is provided on the drive portion.

12. The optical device as recited in claim 11, wherein the heat sink has a plurality of fins arranged at predetermined intervals in a direction of a pivotal axis of the drive portion, each of the plurality of fins extending in a direction perpendicular to the pivotal axis of the drive portion.

13. The optical device as recited in claim 11, wherein the heat sink has a central portion and edge portions along a direction perpendicular to a pivotal axis of the drive portion, the edge portions having a height smaller than the central portion.

14. An optical scanner comprising:
a movable portion having a light reflection portion, the movable portion being pivotable about an axis;
a drive mechanism operable to pivot the movable portion so as to scan light reflected from the light reflection portion on an object; and
a cooler configured to cool the movable portion,
wherein the cooler is provided on at least a body of the movable portion, and
wherein the cooler includes a first heat conduction film made of a material having a heat conductivity higher than that of a material of the body of the movable portion, the first heat conduction film serving to radiate heat from the movable portion.

15. An image formation apparatus comprising:
a movable portion having a light reflection portion, the movable portion being pivotable about an axis;
a drive mechanism operable to pivot the movable portion so as to scan light reflected from the light reflection portion in at least one of a main scanning direction and a sub-scanning direction to form an image on an object; and
a cooler configured to cool the movable portion,
wherein the cooler is provided on at least a body of the movable portion, and
wherein the cooler includes a first heat conduction film made of a material having a heat conductivity higher than that of a material of the body of the movable portion, the first heat conduction film serving to radiate heat from the movable portion.

* * * * *